G. W. COLLIN.
SELF-CLEANING STRAINER FOR LIQUIDS.
APPLICATION FILED MAR. 21, 1916.

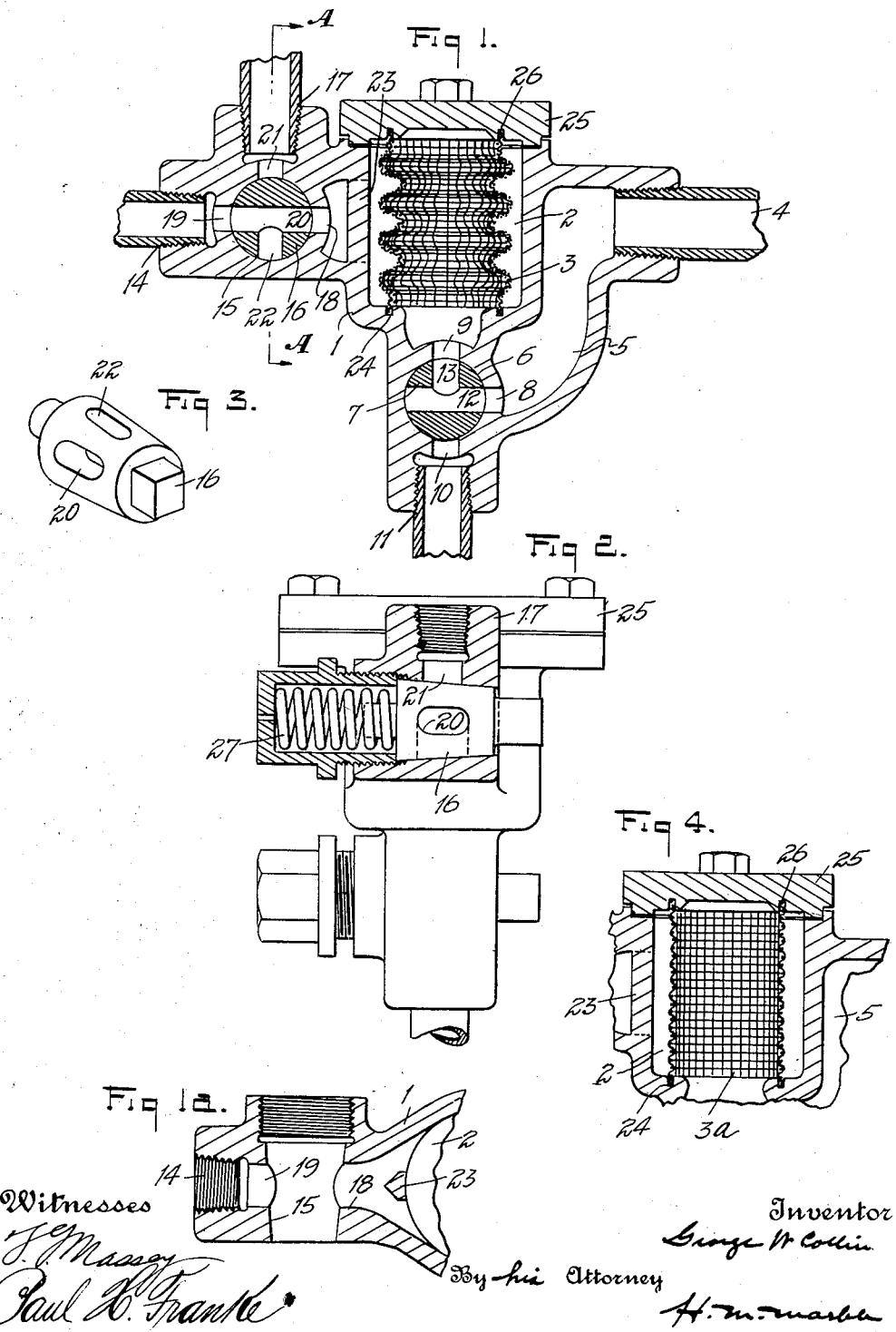

1,216,547.

Patented Feb. 20, 1917.
2 SHEETS—SHEET 2.

Witnesses

Inventor
George W Collin
By his Attorney

UNITED STATES PATENT OFFICE.

GEORGE W. COLLIN, OF BRIDGEPORT, CONNECTICUT.

SELF-CLEANING STRAINER FOR LIQUIDS.

1,216,547. Specification of Letters Patent. Patented Feb. 20, 1917.

Application filed March 21, 1916. Serial No. 85,563.

*To all whom it may concern:*

Be it known that I, GEORGE W. COLLIN, a citizen of the United States of America, and a resident of Bridgeport, county of Fairfield, and State of Connecticut, have invented a certain new and useful Self-Cleaning Strainer for Liquids, of which the following is a specification.

My invention relates to improvements in strainers such as are intended for insertion in pipes or conduits carrying liquids, such as water, oil, tar, etc.; and comprises a construction which, by reason of its design, is readily connected to a pipe line without material change in the lead of the line, and which is readily cleansed.

The object of my invention is to provide a readily cleansed strainer of simple and relatively inexpensive construction and which is well adapted for insertion in ordinary pipe lines, including lines already in place, and without material change of the lead of the line.

I will now proceed to describe my invention with reference to the accompanying drawings, and will then point out the novel features in claims. In said drawings:

Figure 1 shows a central vertical section of one form of strainer embodying my invention, the section being taken on a plane including the axes of the main inlet and outlet connections of the strainer.

Fig. 1ª is a fragmentary horizontal section of the "splitter" and adjacent portions of the strainer body.

Fig. 2 shows a side elevation and partial vertical section of the structure of Fig. 1, the section being taken on the line A—A of Fig. 1.

Fig. 3 is a detail perspective elevation of the valve plug shown in section in Fig. 2.

Fig. 4 shows a fragmentary vertical section of a structure similar to that of Fig. 1, and illustrates an alternative form of screen cylinder which may be employed.

Figure 5:
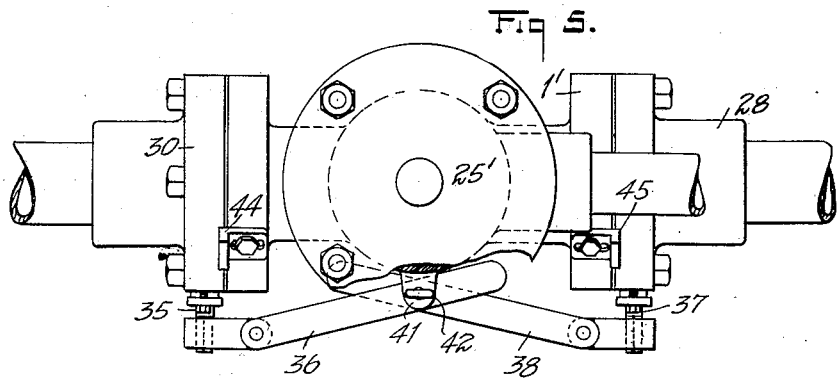
Fig. 5 shows a top view of another form of strainer embodying my invention.

Referring first to Figs. 1–3 inclusive, numeral 1 designates the strainer body having within it a straining chamber 2 containing a perforate screen cylinder 3, and having an inlet connection 4 communicating with a passage 5 cored out in body 1, and leading to a valve chamber 6 containing a valve which, in the arrangement shown, is of the turn-plug type, 7 designating the turn-plug. The valve chamber 6 communicates by a port 8 with passage 5; by a port 9 with strainer chamber 2; and by a port 10 with a blow off connection 11. The valve plug 7 has ports 12 and 13 whereby passage 5 may be placed in connection with chamber 2 or, alternatively, chamber 2 may be connected to blow off connection 11.

The strainer body 1 has also a discharge connection 14 the bore of which communicates with strainer chamber 2, such discharge connection being provided with a valve chamber 15 containing a valve which, in this case, is of the turn-plug type, 16 designating the turn-plug; and this outlet connection 14 is also provided with a steam supply connection 17. Said valve chamber 15 has ports 18 and 19, and the valve 16 has a corresponding port 20, whereby strainer chamber 2 may be connected directly to outlet; and the valve chamber 15 has also a port 21, and the valve plug 16 has a corresponding port 22 whereby the steam connection 17 may be connected with strainer chamber 2. A "splitter" 23 is provided, in the path of steam flowing from 17 through the valve 16 to the strainer chamber, whereby steam so entering will be diverted from direct impingement upon the screen cylinder 3, and will be diverted to the sides of that screen cylinder, and so caused to surround the screen cylinder. The form of this splitter is shown in Fig. 1ª.

The screen cylinder is seated at the bottom in a groove 24 provided in the bottom of the strainer chamber 2; and said strainer chamber is provided with a top plate 25 in which there is a groove 26 in which the top of the screen cylinder is seated.

Either or both of the valve plugs 7 and 16 is or may be held seated by means of a spring 27 (Fig. 2) which not only presses the valve plug firmly against its seat, but causes such wear as may be occasioned by service to be taken up automatically.

In the normal operation of this strainer, the liquid to be strained, entering at 4, passes through passage 5 and the ports of valve plug 7 upward into the interior of the screen cylinder 3 and out through the openings of that screen cylinder into the chamber 2 to the discharge connection 14, and thence outward; valve plugs 7 and 16 being then in the position shown; solid matter carried by the liquid being held back by the screen cylinder 3.

When, as will occur from time to time, it is desirable to clean the screen cylinder, valve plugs 7 and 16 are turned so that flow from inlet connection 4 to the interior of the screen cylinder is cut off, and connection of the strainer chamber 2 to discharge 14 is cut off, and so that steam or other suitable fluid under pressure may pass from connection 17 through valve 16 against the sides of the screen cylinder 3 and thence out through valve 7 and blow-off connection 11. It will be noted that such flow of the cleaning fluid through the openings of the screen cylinder is in a direction reverse to the direction of normal flow through that screen cylinder of the liquid to be screened; for which reason the screen will be cleaned very perfectly.

Any suitable fluid under pressure may be used for cleaning the screen; for example, steam or air under pressure, or water or oil, gasolene etc. When the strainer is to be used for straining tar or the like it is especially preferable to use steam as the cleaning fluid, as the heat of the steam softens and disintegrates deposits that may have formed upon the screen cylinder.

The screen cylinder 3 is preferably corrugated as shown; in which case it will have great stiffness and strength by reason of its corrugations, and also will have a greater area of straining surface than would be the case if the screen cylinder were straight. However, a straight or plain screen cylinder may be employed, as indicated in Fig. 4, wherein that screen cylinder is designated by numeral 3ª.

Figure 6:
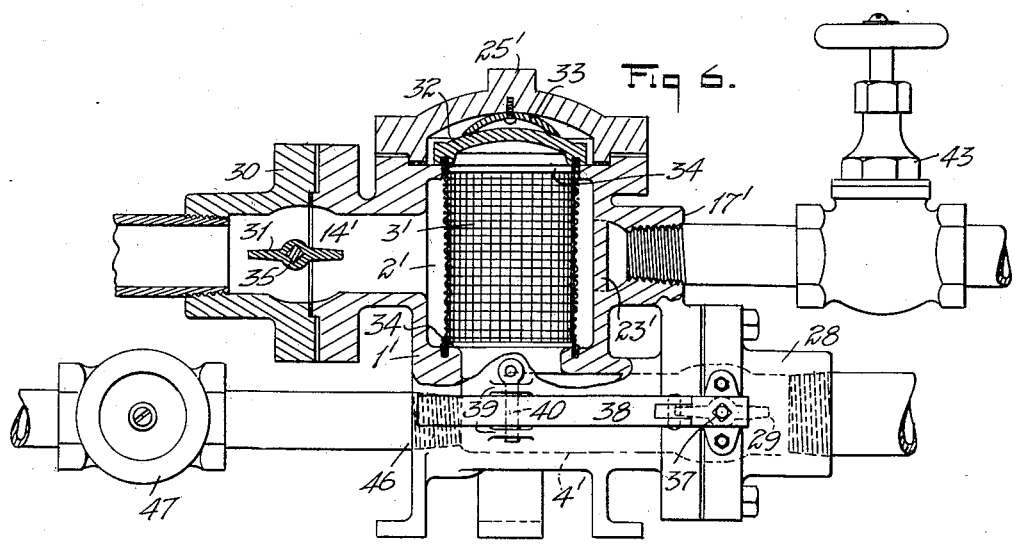
Fig. 6 shows a central vertical section of the Fig. 5 construction.
Figure 7:
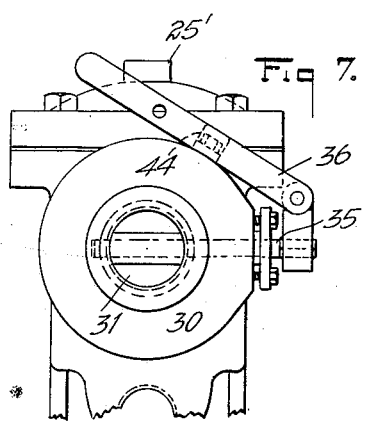
Fig. 7 shows a fragmentary end elevation of that construction.

In Figs. 5 to 7 inclusive I illustrate an alternative form of my strainer, particularly adapted for larger sizes than the strainer shown in Figs. 1–4 inclusive. 1' designates the strainer body, 2' the strainer chamber and 3' the screen cylinder therein. In this particular construction the service inlet connection 4' is below the level of the strainer chamber and is directly connected thereto at the bottom. 14' designates the discharge connection. In this construction I have shown the inlet connection 4' provided with a fitting 28 containing a butterfly valve 29; and I have shown the service outlet connection 14' provided with a fitting 30 containing a butterfly valve 31. The inlet 17' for cleaning fluid is, in this construction, located opposite the service discharge connection 14', a splitter 23' being provided to prevent direct impact of the cleaning fluid upon the screen. The screen cylinder is seated in the bottom of the strainer casing in the same manner as previously described with reference to Fig. 1; but at the top, such screen cylinder is seated in a holding plate 32 itself held seated by the cover 25' of the valve casing, and by a spring 33 intermediate said cover and the plate 32. The screen cylinder is also held in alinement within the strainer chamber by a rim 34 formed on the inner surface of the valve body.

The stem 35 of butterfly valve 31 projects through the wall of fitting 30 and has hinged to it an operating handle 36. Similarly, the stem 37 of butterfly valve 29 projects through the wall of the fitting 28 and has hinged to it an operating lever 38. Lugs 39 (Fig. 6) and a pin 40 are provided for locking the valve lever 38 in the open position of valve 29, and corresponding lugs 41 and a locking pin 42 are provided for holding the valve lever 36 in the open position of its valve 31. A suitable valve 43 is provided for controlling the supply of cleaning fluid to connection 17'.

In normal operation valves 29 and 31 stand open, the fluid to be strained entering through 4' and passing up into screen cylinder 3' and out through the perforations of that screen cylinder into the strainer chamber 2' and thence out through discharge connection 14' past valve 31. To clean the screen cylinder valves 31 and 29 are closed by means of their levers 36 and 38, valve 31 being held in such closed position by engaging its lever 36 with a lug 44 adjustably mounted on the strainer body, as indicated in Fig. 5; and similarly valve 29 is closed by its lever 38, and such lever is held in such closed position by engagement with the lug 45 likewise adjustably mounted on the strainer body. Steam or other suitable cleaning fluid is then admitted through valve 43 and passes around the splitter 23' into the strainer chamber 2' and thence through the perforations of the screen cylinder and out through a blow-off connection 46 normally closed by a valve 47; which valve 47, however, is open when so cleaning the screen.

In Fig. 6 I have shown the screen cylinder 3' as of the straight cylindrical type; but obviously a corrugated screen cylinder might be employed instead, as in the construction of Fig. 1.

What I claim is:

1. A strainer such as described, comprising a strainer body having within it a generally cylindrical strainer chamber with an inlet duct formed in the strainer body and entering such strainer chamber from one end of said chamber, said strainer body having also a blow off duct formed in the strainer body and adapted for communication with the strainer chamber through said inlet duct, said strainer body having also an outlet duct formed in it and communicating with said strainer chamber through the side thereof, said strainer body having also a cleaning fluid duct adapted to discharge into said strainer chamber, and having a splitter in the path of such discharge, whereby cleaning fluid entering said strainer chamber is diverted laterally; in combination with a generally cylindrical hollow screen member located longitudinally in said strainer chamber and seated at its ends in the ends of said chamber, whereby fluid to be screened enters the screen through one end and passes out through the side thereof, and whereby cleaning fluid enters the screen through the side and passes out through one end thereof; and in combination with valve means controlling the inlet duct and blow off duct and the outlet duct and cleaning fluid duct.

2. A strainer such as described, comprising a strainer body having, as a separable part of it, a removable plate, said body having within it a generally cylindrical strainer chamber, one end of which is normally closed by said plate, said body having an inlet duct formed in it and which enters such strainer chamber from the end of that chamber opposite said plate, said strainer body having also a blow-off duct formed in it and adapted for communication with the strainer chamber through said inlet duct, said strainer body having also an outlet duct formed in it and communicating with said strainer chamber through the side thereof, said strainer body having also a cleaning fluid duct adapted to discharge into said strainer chamber, and having a splitter in the path of such discharge whereby cleaning fluid entering said strainer chamber is diverted laterally; in combination with a generally cylindrical hollow screen member located longitudinally in said strainer chamber and seated at one end in an end wall of said strainer chamber, surrounding the mouth of the inlet duct, and seated at the other end in the said removable plate, whereby the strainer body is held in place within said strainer chamber, and whereby fluid to be screened enters the screen through one end and passes out through the side thereof, and whereby cleaning fluid enters the screen through the side and passes out through one end thereof; and in combination with valve means controlling the inlet duct and blow-off duct and the outlet duct and cleaning fluid duct.

3. A strainer such as described comprising a strainer body having within it a generally cylindrical strainer chamber with an inlet duct formed in the strainer body and entering such strainer chamber from one end of said chamber, said strainer body having also a blow-off duct formed in the strainer body and adapted for communication with the strainer chambers through said inlet duct, said strainer body having also an outlet duct formed in it and communicating with said strainer chamber through the side thereof, and provided near its communication with said strainer chamber with a splitter arranged to divert fluid flowing through the outlet duct into said strainer chamber to the sides of said strainer chamber, said strainer body having also a cleaning fluid duct adapted for the discharge of cleaning fluid through said outlet duct into said strainer chamber; in combination with a generally cylindrical hollow screen member located longitudinally in said strainer chamber and seated at its ends in the ends of said chamber; and in combination with a three-way valve at the intersection of the outlet duct and cleaning fluid duct, and arranged to permit flow outwardly through the outward duct, or, alternatively, inwardly through the cleaning fluid duct and outlet duct past the splitter, and in further combination with valve means controlling the inlet duct and blow-off duct.

4. A strainer such as described, comprising a strainer body having within it a strainer chamber and a hollow screen member within that chamber and spaced away from the walls thereof, said strainer body having service inlet and outlet connections, one of which connects with the interior of such screen member, and the other of which connects with the space in said strainer chamber surrounding said screen member, butterfly valves for closing and opening at will said inlet and outlet connections, valve operating means for one or both of said valves comprising an operating lever hinged to its corresponding valve and adapted to engage lugs provided on the strainer body at positions corresponding to the closed and open position of the corresponding valve, said strainer body having also a cleaning fluid-connection and a blow-off connection, the former of which connects with the space to which the service outlet connects, and the latter of which connects with the space to which the service inlet connects.

5. A strainer such as described, comprising a strainer body having within it a strainer chamber and a hollow screen member within that chamber and spaced away from the walls thereof, said strainer body having service inlet and outlet connections, the former of which connects with the interior of such screen member, and the latter of which connects with the space in said strainer chamber surrounding that screen member, said strainer body further having a cleaning fluid connection leading to the space in said strainer chamber surrounding said screen member and having also a splitter located at the inlet of said cleaning fluid to the sides of such screen member, said strainer body having also a blow-off connection and valve means controlling the flow through such service inlet connection and blow-off connection, and through such service outlet connection and cleaning fluid inlet connection.

In testimony whereof I have signed this specification in the presence of two subscribing witnesses.

GEORGE W. COLLIN.

Witnesses:
 THEODORE LEONARD,
 W. E. BURNHAM.